US010776490B1

(12) United States Patent
Gerraty

(10) Patent No.: US 10,776,490 B1
(45) Date of Patent: Sep. 15, 2020

(54) VERIFYING AN OPERATING SYSTEM DURING A BOOT PROCESS USING A LOADER

(71) Applicant: Juniper Networks, Inc., Sunnyvale, CA (US)

(72) Inventor: Simon J. Gerraty, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 222 days.

(21) Appl. No.: 15/856,249

(22) Filed: Dec. 28, 2017

(51) Int. Cl.
*H04L 29/06* (2006.01)
*G06F 21/57* (2013.01)
*G06F 9/4401* (2018.01)

(52) U.S. Cl.
CPC .......... *G06F 21/575* (2013.01); *G06F 9/4406* (2013.01); *G06F 2221/034* (2013.01)

(58) Field of Classification Search
CPC .............. H04L 9/00; G06Q 10/00; G06F 9/00
See application file for complete search history.

(56) References Cited

U.S. PATENT DOCUMENTS

2014/0298032 A1* 10/2014 Crowder, Jr. ......... H04L 9/3247
713/176

* cited by examiner

*Primary Examiner* — Joseph P Hirl
*Assistant Examiner* — Leynna Truvan
(74) *Attorney, Agent, or Firm* — Harrity & Harrity, LLP

(57) ABSTRACT

An example device includes one or more memories; and one or more processors, communicatively coupled to the one or more memories, to, during a loading process of a boot process of an operating system, identify a file to be loaded for the operating system, where the operating system is being loaded during the boot process; identify a manifest of the file; verify the manifest of the file based on a supplied signature of the manifest; identify a fingerprint, associated with the file, in a fingerprint library; calculate a hash of the file; compare the hash of the file and the fingerprint; and verify the file based on the hash of the file matching the fingerprint associated with the file.

20 Claims, 6 Drawing Sheets

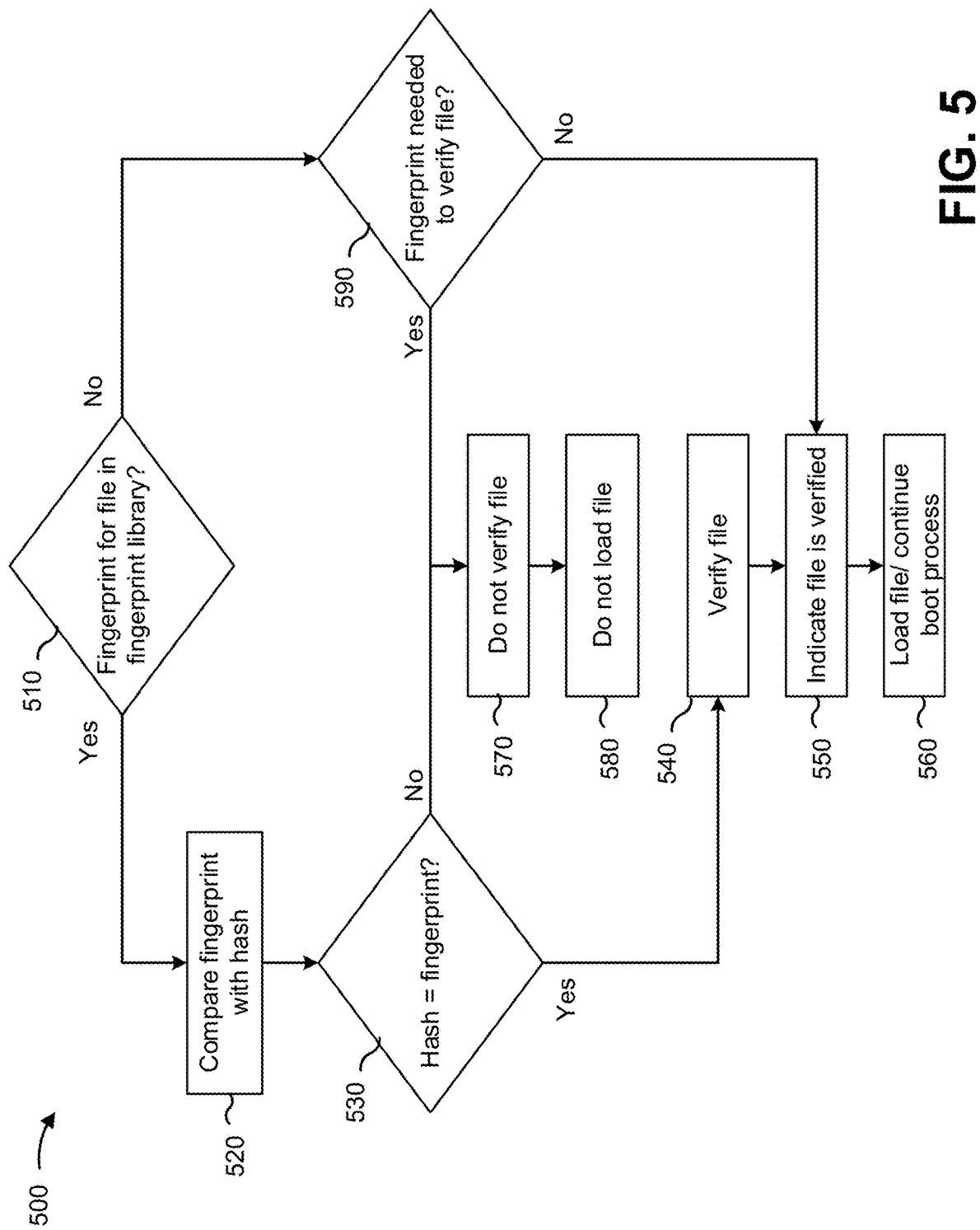

VERIFYING AN OPERATING SYSTEM DURING A BOOT PROCESS USING A LOADER

BACKGROUND

In computing, booting is an initialization of a computing system. A loader is a program that is responsible for loading an operating system. To load the operating system, the loader loads a kernel and/or modules of the operating system. Once loaded, the kernel may continue or take over the boot process from the loader to load remaining programs of the operating system. Once the operating system is fully loaded, the operating system may be accessed and/or controlled by a user (e.g., via user input devices).

SUMMARY

According to some implementations, a device includes one or more memories; and one or more processors, communicatively coupled to the one or more memories, to, during a loading process of a boot process of an operating system, identify a file to be loaded for the operating system, where the operating system is being loaded during the boot process; identify a manifest of the file; verify the manifest of the file based on a supplied signature of the manifest; identify a fingerprint, associated with the file, in a fingerprint library; calculate a hash of the file; compare the hash of the file and the fingerprint; and verify the file based on the hash of the file matching the fingerprint associated with the file.

According to some implementations, a non-transitory computer-readable medium storing instructions that, when executed by one or more processors during a loading process of a boot process, cause the one or more processors to identify a file to be loaded for an operating system, where the operating system is being loaded during the boot process; identify a manifest of the file based on a prefix of the file; verify the manifest of the file based on a signature of the manifest and a certificate chain of the signature; identify a fingerprint associated with the file in a fingerprint library; calculate a hash of the file based on the fingerprint; compare the hash of the file and the fingerprint; and perform an action associated with the boot process of the operating system based on comparing the hash of the file and the fingerprint.

According to some implementations, a method for verifying a file during a loading process of a boot process of an operating system, the method includes identifying, by a device, the file to be loaded for the operating system during the boot process of the operating system; determining, by the device, whether a manifest of the file has been verified during the boot process; verifying, by the device, a manifest of the file, when the manifest has not been verified during the boot process, based on a signature of the manifest and a supplied certificate chain associated with the signature; determining, by the device, whether a fingerprint associated with the file is in a fingerprint library associated with the operating system; calculating, by the device, a hash of the file based on the fingerprint associated with the file being in the fingerprint library; comparing the hash of the file and the fingerprint associated with the file to verify the file; and performing, by the device and based on comparing the hash of the file and the fingerprint associated with the file, an action associated with verifying the file.

BRIEF DESCRIPTION OF THE DRAWINGS

FIG. 5 is a flow diagram of an example process relating to the example process shown in FIG. 4.

DETAILED DESCRIPTION

The following detailed description of example implementations refers to the accompanying drawings. The same reference numbers in different drawings may identify the same or similar elements.

Malware may be detrimental to any computing environment in which the malware is released. In many instances, files and/or modules of operating systems may be verified by a verification program of the operating system to confirm that the files and/or modules do not contain malware. In such instances, the verification program may compare hashes of the files and/or modules with verification fingerprints of the files and/or modules. When the hashes of the files and/or modules match the verification program may determine that the files and/or modules do not include malware and allow the files and/or modules to load. On the other hand, when the hashes of the files and/or modules do not match the verification program may determine that the files and/or modules may contain malware and may prevent the file from loading. However, in many instances, files and/or modules may be corrupted with malware prior to the operating system being fully loaded (e.g., during a boot process). As such, during the boot process, malicious files and/or malicious modules may be loaded (e.g., by a loader) when the operating system is loaded.

According to some implementations described herein, a loader may perform a verification process to verify files and/or modules (e.g., files or modules associated with a kernel) of the operating system during a loading process of the boot process. Accordingly, some implementations described herein may prevent malware from harming targeted systems, and thus prevent system failures, shutdowns, inoperability, security breaches, loss of files or information (e.g., personal or financial information), theft, or the like. Furthermore, the verification process performed by the loader can prevent loading of accidentally corrupted modules and/or kernels of an operating system, which can result in operability or failure of the system hosting the operating system. Therefore, some implementations herein may ensure the health of a system by preventing a malware attack, thus, conserving resources, time, and costs of handling an attacked system and/or recovering the system from the potential malware attack.

Figure 1A:
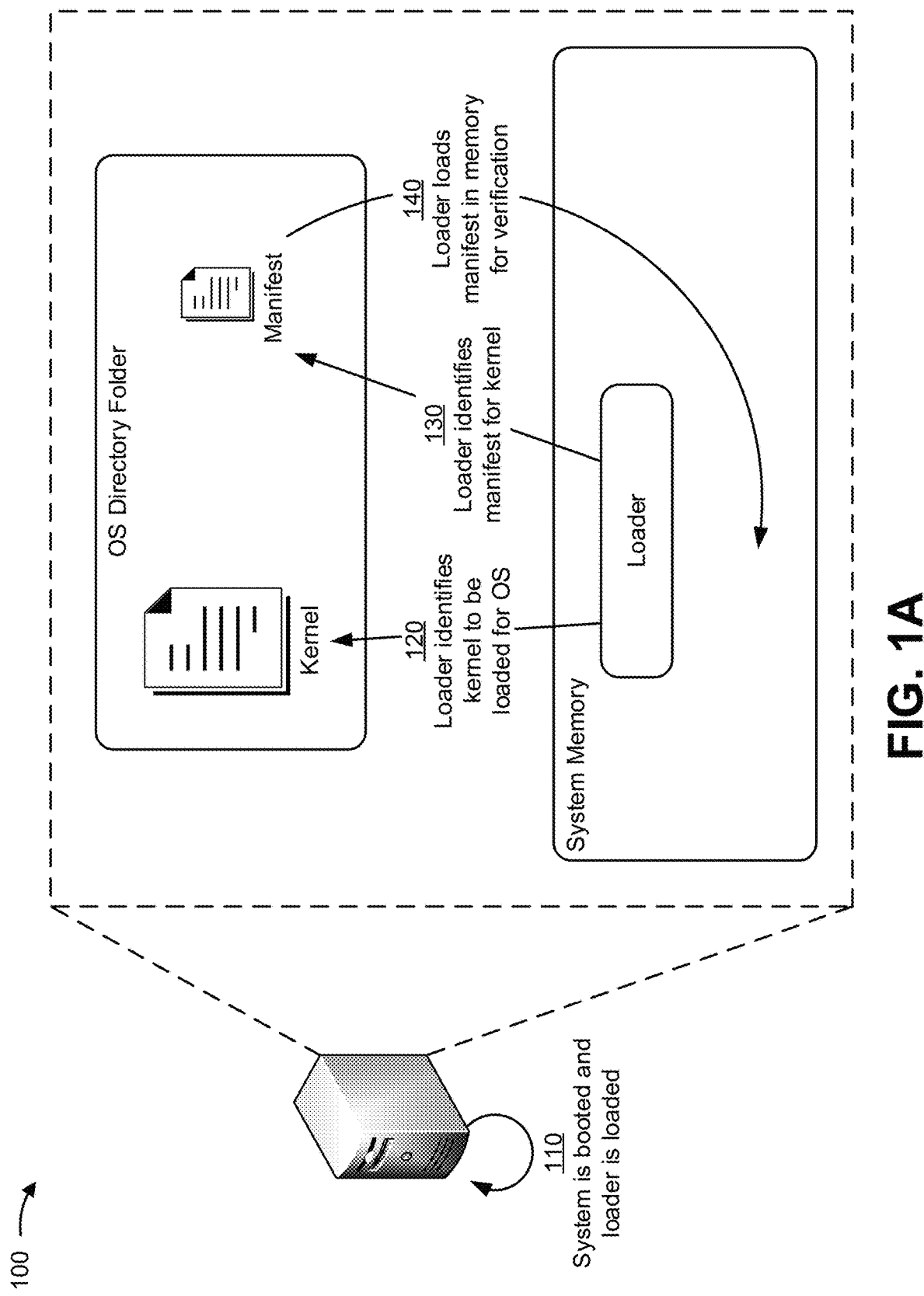
FIGS. 1A and 1B are diagrams of an overview of an example implementation described herein.
Figure 1B:
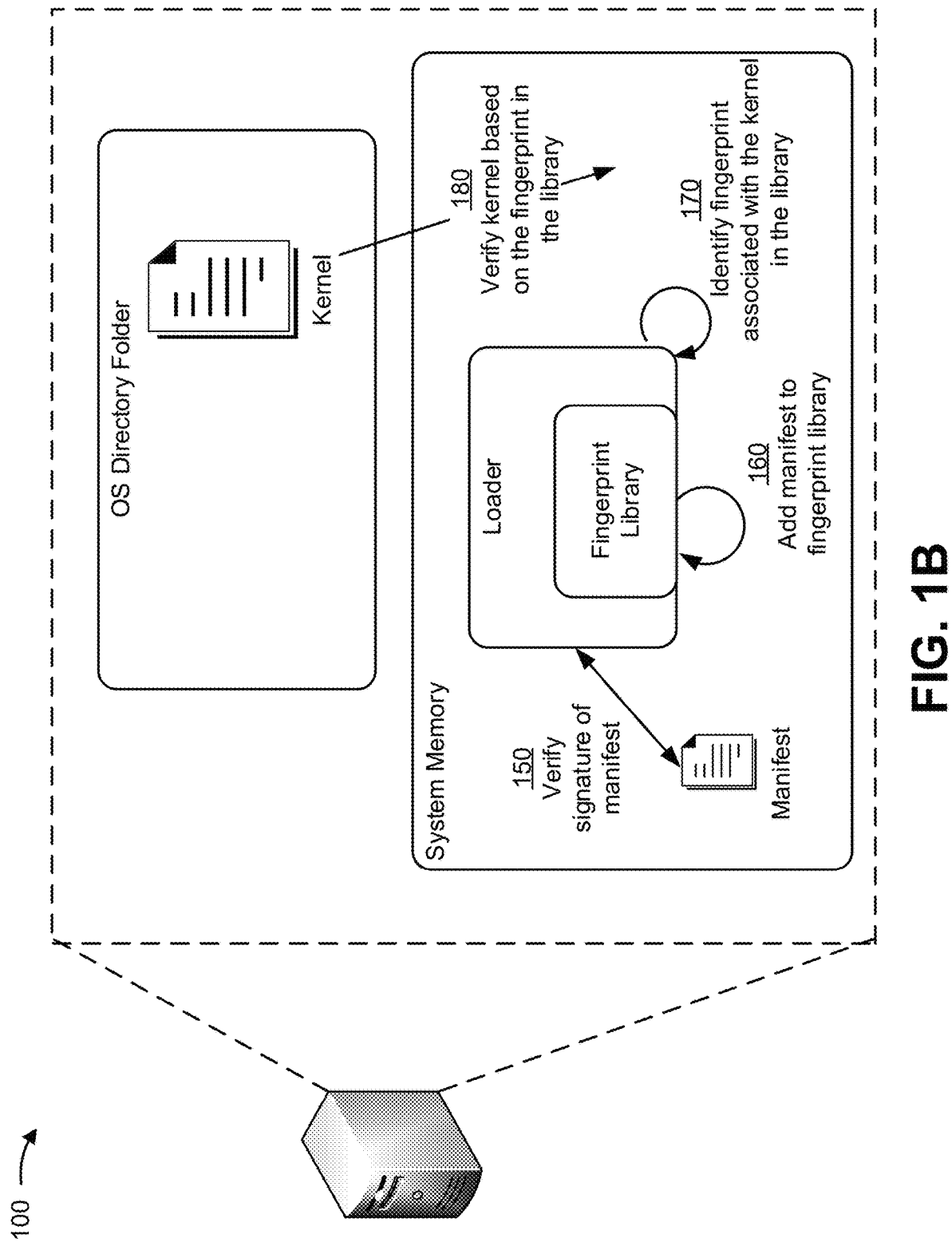

FIGS. 1A and 1B are diagrams of an overview of an example implementation 100 described herein. As shown in FIGS. 1A and 1B, example implementation 100 may include a system (e.g., a computer, router, or other device) that may include an operating system directory folder that identifies a kernel, and that includes a manifest of the operating system associated with the system. The system may also include a memory that stores a loader that loads, during a boot process, components and/or files of the operating system before turning over the boot process to the kernel to boot up remaining portions of the operating system.

As shown in FIG. 1A, and as shown by reference number 110, the system is booted and the loader is loaded. For example, a user may select a power button of the system to cause the system to be booted or software may initialize a reboot of the system. As shown by reference number 120, the loader, upon being loaded into memory, identifies a kernel (e.g., which may include one or more files or modules that need to be loaded), in the operating system directory of the system, to be loaded for the operating system. As shown by reference number 130, the loader identifies a manifest for the kernel. The loader may identify the manifest for the file based on a directory path of the file (e.g., a prefix) and/or an identifier of the file and a corresponding identifier of the manifest. As shown by reference number 140, the loader loads the manifest into the memory for verification. In some implementations, the loader may verify files that indicate which kernels and/or modules are to be loaded.

As shown in FIG. 1B, and as shown by reference number 150, the loader verifies the manifest. For example, the loader may verify the signature based on a signature of the manifest (e.g. manifest.sig). As shown by reference number 160, the loader adds the manifest to the fingerprint library. The example fingerprint library of may include fingerprints associated with a verified kernel. As such, the manifest being added to the library may be representative of a verified manifest of the kernel.

As shown further shown in FIG. 1B, and by reference number 170, the loader identifies a fingerprint associated with the kernel in the library. As shown by reference number 180, if the loader verifies the kernel based on the fingerprint in the library. In some implementations, if a fingerprint associated with the kernel is not in the fingerprint library, the loader may not verify the file.

In this way, the loader may verify a kernel to ensure that the files of the kernel have not been corrupted prior to or during the boot process, thereby preventing malware from harming targeted systems, and, thus, preventing system failures, shutdowns, inoperability, security breaches, loss of files or information (e.g., personal or financial information), theft, or the like. Therefore, the loader may ensure the health of the system by preventing a malware attack, thus, conserving resources, time, and costs of handling an attacked system and/or recovering the system from the potential malware attack.

As indicated above, FIGS. 1A and 1B are provided merely as an example. Other examples are possible and may differ from what was described with regard to FIGS. 1A and 1B.

Figure 2:
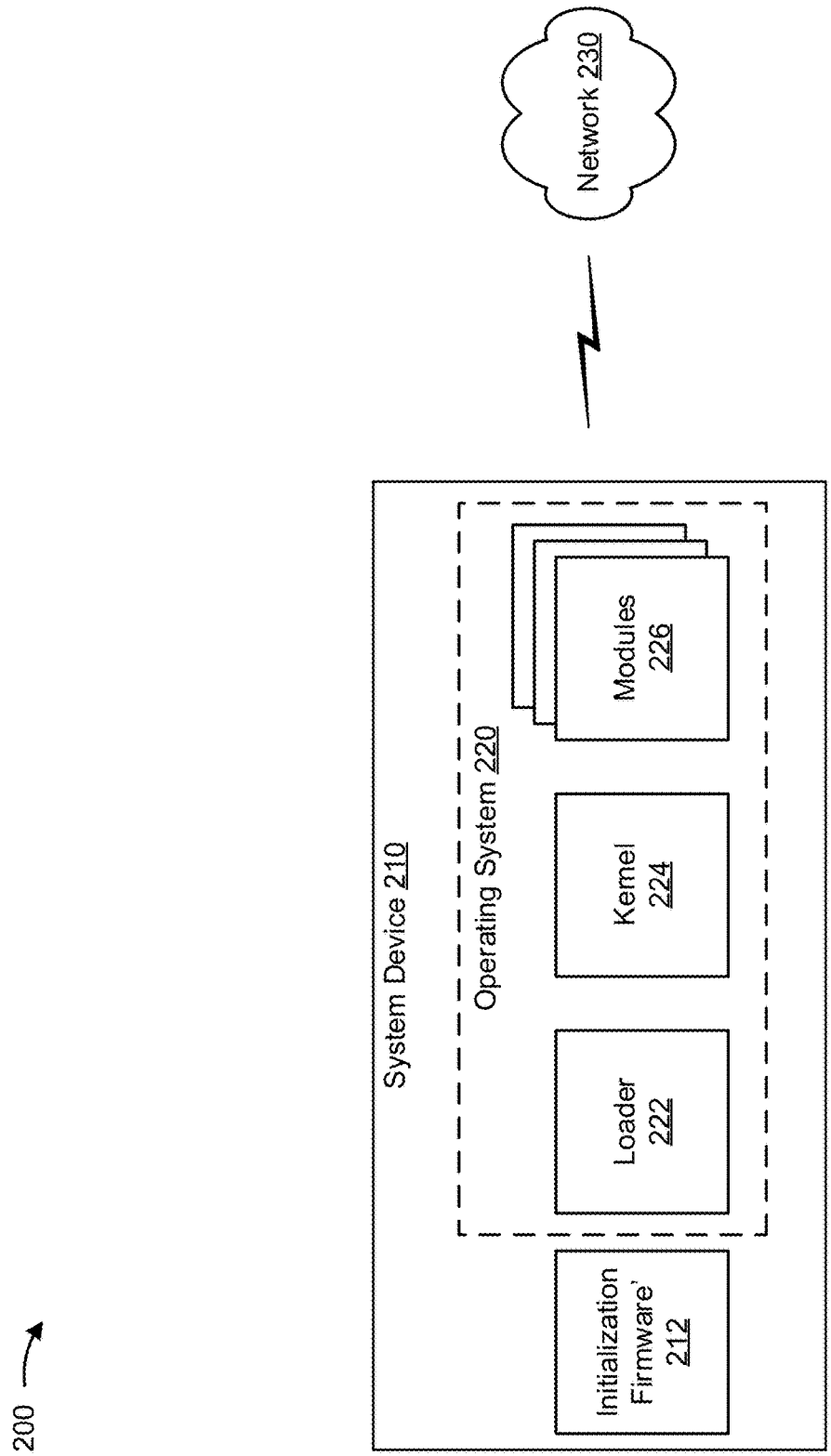
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a system device 210 and a network 230. System device 210 may include initialization firmware 212 and an operating system 220, which includes a loader 222, a kernel 224, and one or more modules 226 (which may be referred to herein, individually, as "module 226" or, collectively, as "modules 226). Devices of environment 200 may interconnect via wired connections, wireless connections, or a combination of wired and wireless connections.

System device 210 includes a user device, a server device, or a network device. System device 210 may include one or more devices capable of loading an operating system for receiving, generating, storing, processing, and/or providing information. For example, system device 210 may include a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), a server, or a similar type of device. In some implementations, system device 210 may include a network device, such as one or more devices (e.g., one or more traffic transfer devices) capable of loading an operating system used for processing and/or transferring traffic between endpoint devices. For example, system device 210 may include a firewall, a router, a gateway, a switch, a hub, a bridge, a reverse proxy, a server (e.g., a proxy server), a security device, an intrusion detection device, a load balancer, or a similar device. In some implementations, system device 210 may be a physical device implemented within a housing, such as a chassis. In some implementations, system device 210 may be a virtual device implemented by one or more computer devices of a cloud computing environment or a data center.

Initialization firmware 212 includes hardware and/or a combination of hardware and software that initiates a loading process of the boot process. In some implementations, the initialization firmware 212 may be capable of initiating a "hard" boot (e.g., when power is applied to a component of system device 210) or a "soft" boot (e.g., when power is already applied to a component of system device 210 and software initiates a boot process). In some implementations, initialization firmware 212 may perform power-on self-tests (POSTs) of system device 210. In such cases, after initialization firmware 212 performs the POSTs, loader 222 is called to load operating system 220.

Operating system 220 includes a program that manages hardware and/or software of system device 210. Operating system 220 may host applications and/or programs that may be accessible (e.g., via input components and/or output components) to users or other devices of system device 210.

Loader 222 includes a program or application programming interface (API) of operating system 220 that performs loading process that loads kernel 224 and/or modules 226 during the boot process. Loader 222 is loaded into main memory (e.g., from persistent memory) to load kernel 224 and modules 226. According to some implementations described herein, when loading kernel 224, loader 222 performs a verification process of kernel 224. For example, loader 222 may verify files of kernel 224 and/or modules 226 associated with kernel 224 using a hash calculation and one or more fingerprint libraries of loader 222. After verifying kernel 224 and/or any modules 226 associated with kernel 224, loader 222 hands over the boot process to kernel 224, which completes the boot process by loading remaining modules 226 (e.g., modules 226 that were not loaded by loader 222 during the boot process) of operating system 220.

Kernel 224 includes a programs that serve as a controller and/or central core of operating system 220. For example, kernel 224 may include a monolithic kernel, a microkernel, a nanokernel, an exokernel, a hybrid kernel, a base kernel, and/or the like. According to some implementations described herein, kernel 224 is verified (e.g., by loader 222) during a boot process to prevent files of kernel 224 or modules 226 from being corrupted (e.g., with malware) after POSTs are performed by initialization firmware 212 and prior to kernel 224 loading operating system 220. Once verified and loaded, kernel 224 may continue the boot process. After the boot process of system device 210 is complete, kernel 224 may serve as an interface between hardware of system device 210 and software of system device 210.

Modules 226 include programs, processes, files and/or the like. In some implementations, one or more of modules 226 may be associated with kernel 224. In such instances, the modules 226 may be loaded and/or activated during a boot process by loader 222 to extend operation of a kernel of an operating system (e.g., kernel 224). For example, module 226 may include a kernel extension module, a kernel-mode driver, a downloadable module, and/or the like. In some implementations, modules 226 are verified by loader 222 during the boot process. In some implementations, one or more modules 226 may be loaded and/or verified by kernel 224 (e.g., after loader 222 hands over the boot process to kernel 224). In such instances, the one or more modules 226 may be modules used for user interaction with operating system 220.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
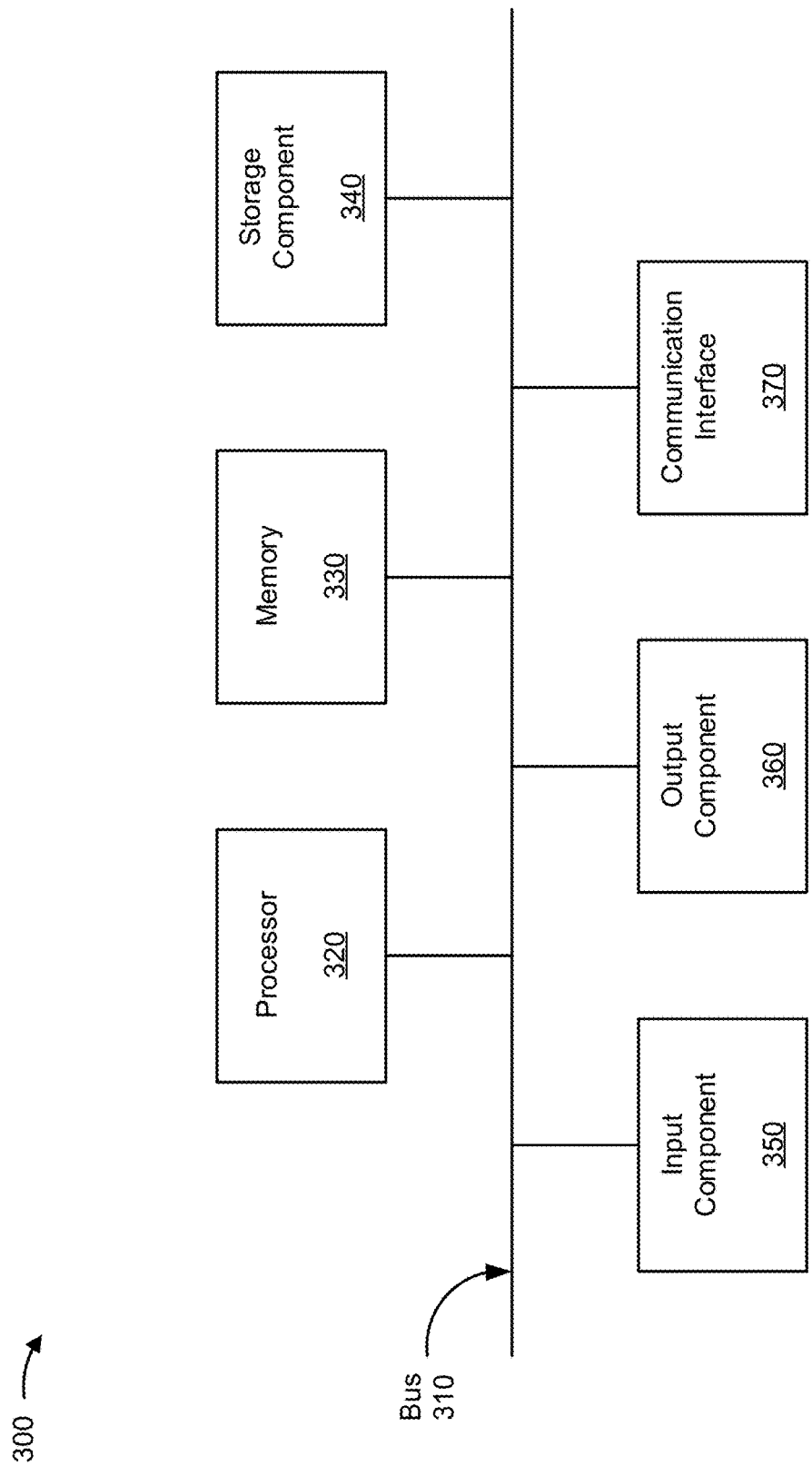
FIG. 3 is a diagram of example components of one or more devices of FIG. 2.

FIG. 3 is a diagram of example components of a device 300. Device 300 may correspond to system device 210. In some implementations, system device 210 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
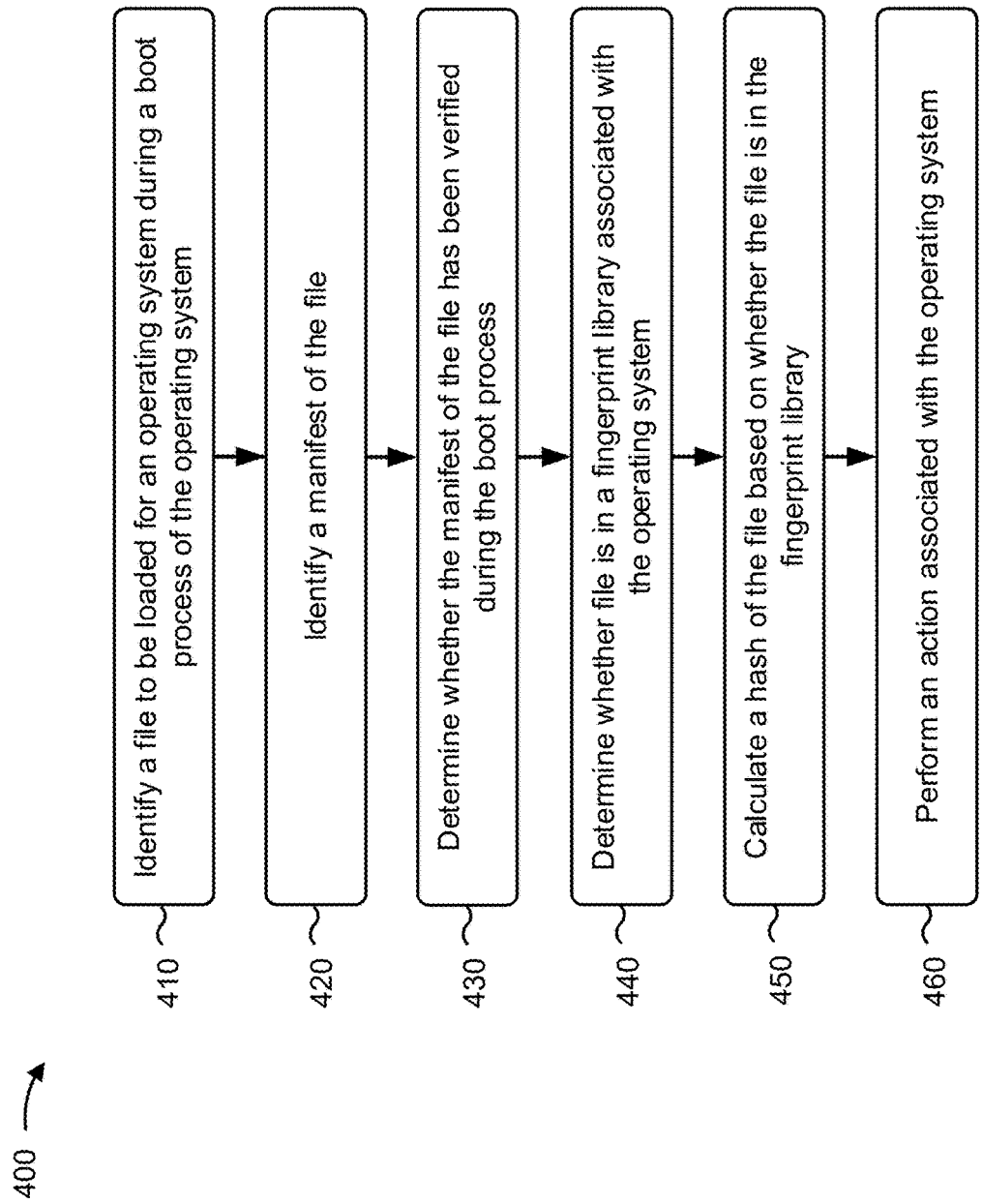
FIG. 4 is a flow chart of an example process for verifying an operating system during a boot process using a loader.

FIG. 4 is a flow chart of an example process 400 for verifying an operating system during a boot process using a loader. In some implementations, one or more process blocks of FIG. 4 may be performed by one or more elements of system device 210, such as loader 222. In some implementations, one or more process blocks of FIG. 4 may be performed by another element of group of elements of system device 210, such as initialization firmware 212, kernel 224, and/or modules 226.

As shown in FIG. 4, process 400 may include identifying a file to be loaded for an operating system during a boot process of the operating system (block 410). For example, loader 222 of system device 210 may identify the file. In some implementations, loader 222 may identify the file based on a boot process of operating system 220 being initiated, based on loader 222 being loaded into a memory of system device 210, based on initialization firmware 212 completing boot initialization processes (e.g., POSTs), and/or the like.

A file may be a file containing object code (e.g., machine language code) that may be executed (e.g., when linked into an executable file). For example, a file may be an operating system kernel file containing operating system kernel code that, when executed, enables the operating system of a computer system to perform one or more functions essential to the computer system. In some implementations, the file may be associated with a manifest. A manifest (e.g., for a computer program) is a file containing metadata, such as a name, a version number, files (e.g., that constitute the computer program), and/or the like.

In some implementations, loader 222 may determine a type of the file and may identify the file is to be verified based on whether the file is a particular type. In some implementations, loader 222 may identify the file by obtaining and/or reading the file. For example, loader 222 may obtain some types of files that are to be verified, but may not obtain other types of files that are not to be verified by loader 222. In some implementations, loader 222 may perform a verification based on a best method associated with a particular file. For example, certain types of files (e.g., kernel 224, modules 226) must be verified, while other types of files may not necessarily be verified (e.g., file names that end in ".conf" or ".hints"). In some implementations, loader 222 may load the file (e.g., place the file into a memory of system device 210) by performing a read of the file.

In this way, loader 222 of system device 210 may obtain a file that is to be loaded for an operating system to enable loader 222 to determine whether file is to be verified during the boot process.

As further shown in FIG. 4, process 400 may include identifying a manifest of the file (block 420). For example, loader 222 may identify the manifest for the file. In some implementations, loader 222 may identify the manifest for the file based on obtaining the file, determining that the file has not been verified, detecting that the boot process has been initiated, and/or the like.

In some implementations, loader 222 may identify a manifest of or associated with a file based on a file descriptor, prefix, or identifier (e.g., a name, a number, a character string, and/or the like) of the file and/or manifest. For example, the file and/or manifest may include a same descriptor, prefix, and/or identifier in a name of the file and/or manifest.

In some implementations, loader 222 may obtain the manifest from a directory or path that is the same as, or associated with, a directory or path of the file that has been obtained. For example, loader 222 may identify a location of the file, and may obtain the manifest from a location that is the same as, or associated with, the identified location. As such, loader 222 may obtain the manifest of a file that has a same or similar file descriptor, prefix, and/or identifier as the file and that is within a same or associated directory of path of the file.

In this way, loader 222 may obtain the manifest for the file to permit loader 222 to determine whether the manifest of the file has been verified during the boot process, as described herein.

As further shown in FIG. 4, process 400 may include determining whether the manifest has been verified during the boot process (block 430). For example, loader 222 may determine that the manifest of the file has been verified during the boot process or that the manifest of the file has not been verified during the boot process. In some implementations, loader 222 may determine whether the manifest of the file has been verified based on obtaining the manifest of the file.

According to some implementations, the manifest is verified using a digital signature. However, files in the manifest or referred to by the manifest may be verified by the fingerprints recorded in the manifest. In some implementations, the digital signature of the manifests are to be verified using a supplied certificate chain (e.g., an X.509 certificate chain). Accordingly, the ability to use the certificate chain that is co-located with the signature enables loader 222 to flexibly adapt to verify an increasing amount of files as the system evolves over time.

In some implementations, loader 222 may determine whether the file has been verified during the boot process by referencing a data structure of verified files. For example, loader 222 may maintain a collection (e.g., a linked list, a table, an index, a task graph, and/or the like) of manifests that have been verified during the boot process. The collection may be maintained by adding a most recently verified file to an end (e.g., a top or a bottom) of the collection. In some implementations, the collection may be a collection of manifests associated with verified files.

According to some implementations, if loader 222 is to load multiple manifests with a same prefix, loader 222 may determine a characteristic (or distinguishing feature of the manifest other than the path name) to determine that the manifest is a same manifest that has already been verified, without necessarily having to read the entire manifest. Accordingly, in such cases, loader 222 may refer to the collection to relatively quickly identify whether a file has been recently loaded. In some implementations, if loader 222 determines that the manifest of the file is not in the collection and/or that the manifest of the file is not one of a threshold number of recently loaded or verified manifests, loader 222 may determine that the manifest of the file is to be verified. In some implementations, manifests may be identified within the collection using a prefix of the file and/or manifest. For example, the collection may include a list of prefixes of manifests that have been verified. As such, when a file with a particular prefix is to be loaded, loader 222 may refer to the collection to determine whether the manifest of the file has already been verified during the boot process. Furthermore, in some implementations, because a same prefix may be associated with different manifests (e.g., because multiple manifests are within a same directory), loader 222 may also maintain the collection to include a size of an already verified manifest. As such, to distinguish between different manifests with a same prefix, when determining whether a manifest of a file has already been verified, loader 222 may reference the size of the manifest of the file to determine whether the manifest of the file has already been verified during the boot process.

In this way, loader 222 may determine whether the manifest of the file has been verified during the boot process to permit loader 222 to determine whether a fingerprint associated with the file is in a fingerprint library associated with the operating system.

As further shown in FIG. 4, process 400 may include determining whether a fingerprint associated with the file is in a fingerprint library associated with the operating system (block 440). For example, loader 222 may determine that a fingerprint associated with the file is in one or more fingerprint libraries associated with operating system 220 or that a fingerprint associated with the file is not in the one or more fingerprint libraries associated with operating system 220. In some implementations, loader 222 may determine whether a fingerprint associated with the file is in the fingerprint library based on determining that the manifest of the file has not been verified during the boot process.

A fingerprint library is a collection of fingerprints that are representative of verified (or uncorrupted) manifests of files. In some implementations, the fingerprint library may be a library (e.g., a boot verification library) specific to loader 222 and/or operating system 220. In some implementations, the fingerprint library may be a fingerprint library that may be obtained or downloaded from another source (e.g., via network 230). According to some implementations, the fingerprint library is installed within or is a part of loader 222. In some implementations, the fingerprint library may be updated and/or maintained by loader 222 and/or operating system 220 (e.g., to account for new files and/or modules being added to operating system 220).

In some implementations, loader 222 may refer to a particular fingerprint library location to obtain a fingerprint for the manifest based on a pointer associated with the manifest. For example, a directory of the manifest may include a pointer following the manifest in the directory. As such, loader 222 may obtain the fingerprint from the library location indicated by the pointer. In some implementations, loader 222 may determine that a pointer does not exist. In such instances, loader 222 may scan a fingerprint library to identify a fingerprint for the manifest. In some instances, loader 222 may or may not identify or obtain a fingerprint for the file.

In this way, loader 222 may determine whether a fingerprint associated with the file is in a fingerprint library associated with the operating system to permit loader 222 to calculate a hash of the file.

As further shown in FIG. 4, process 400 may include calculating a hash of the file based on whether the file is in the fingerprint library (block 450). For example, loader 222 may calculate the hash. In some implementations, loader 222 may calculate a hash of the file based on determining that a fingerprint associated with the file is in the fingerprint library.

As described herein, loader 222 may utilize a plurality of hash methods to calculate the hash of the file. However, in some implementations, the method used to calculate the hash may depend on or is indicated by a fingerprint entry found in the fingerprint library. Accordingly, the hash may be calculated based on a characteristic of the fingerprint of the file (or file entry) identified in the fingerprint library. For example, the characteristic of the fingerprint may indicate a type of hash algorithm (e.g., SHA1, SHA256, and/or the like) to use to calculate the hash that corresponds to a type of algorithm used to generate the fingerprint. The characteristic of the fingerprint may be a type of the fingerprint, a length of the fingerprint, an identifier of the fingerprint, and/or any other characteristic that may indicate a type of algorithm used to generate the fingerprint. As such, loader 222 may calculate a hash of the using using a same hash algorithm that was used to generate the fingerprint in the fingerprint library. According to some implementations, loader 222 calculates the hash of the file and compares the hash with the fingerprint for verification purposes.

In this way, loader 222 may calculate a hash of the file to permit loader 222 to perform an action associated with the operating system based on the hash and whether the fingerprint is in the fingerprint library.

As further shown in FIG. 4, process 400 may include performing an action associated with the operating system (block 460). For example, loader 222 may perform an action associated with operating system 220 to continue a boot process or end a boot process based on whether loader 222 can verify the file. In some implementations, loader 222 may perform an action associated with the operating system based on calculating the hash and/or the fingerprint being in the fingerprint library.

In some implementations, such as where loader 222 determines that a fingerprint for the file is included in the fingerprint library, loader 222 may perform an action to verify the file and/or the manifest of the file. For example, to verify the file and/or the manifest of the file, loader 222 may determine whether the hash of the file matches the fingerprint of a fingerprint library of the manifest. If the hash of the file matches the fingerprint within (or identified within) the fingerprint library, then the file can be verified because the fingerprint of the fingerprint library represents an uncorrupted file. Therefore, a hash of the file that matches a fingerprint of the fingerprint library may be presumed to be uncorrupted (or verified). According to some implementations, a hash of a file may match a fingerprint of the manifest when a value of the hash of the file matches a value of the fingerprint.

In some implementations, such as where loader 222 determines that the fingerprint for the file is in the fingerprint library and matches the hash and/or where loader 222 determines that a fingerprint is not needed to verify the file, loader 222 may perform an action to verify and/or load the file. Additionally, or alternatively, in such instances, loader 222 may perform an action to indicate the file is verified. For example, loader 222 may indicate (e.g., via a user interface of system device 210) and/or send (e.g., via a communication device of system device 210) a notification (e.g., a message, a text, a signal, and/or the like) indicating that the file has been verified. Furthermore, loader 222 may perform an action to continue the boot process (e.g., by identifying a next file that is to be verified in the boot process, and repeating the example process 400 for the next file).

In some implementations, such as where loader 222 determines that a fingerprint for the files not included in the fingerprint library, loader 222 may perform an action to determine whether a fingerprint is needed to verify the file (e.g., to determine whether the file can be loaded or not). For example, loader 222 may determine whether the file is a type of file that is to be verified during a boot process, as some files (e.g., files that are not susceptible to malware or corruption) may not necessarily need to be verified during a boot process. If loader 222 determines that the file is not to be verified (e.g., based on a characteristic of the file (e.g., a file descriptor, a prefix, an identifier, an extension, and/or the like)), loader 222 may load the file and the boot process may continue. However, if the file is a type of file that is to be verified before being loaded, and no fingerprint can be found, loader 222 may perform an action including preventing loading of the file and/or ending the boot process.

Accordingly, as described herein, performing an action may include loader 222 verifying a file to continue the boot process. In some implementations, loader 222 may verify the file based on a manifest of the file already being verified during the boot process. As another example, loader 222 may verify the file based on whether a hash of the file matches a fingerprint associated with the file. As another example, loader 222 may automatically verify the file based on the file being a type of the file without comparing a hash and fingerprint of the file (e.g., a type of file that does not have to be verified using a hash and/or fingerprint comparison). Additionally, or alternatively, when a file is verified during a boot process, loader 222 may present and/or send an alert indicating that the file has been verified.

In some implementations, loader 222 attempts to load all files of a kernel or operating system. However, in some implementations, loader 222 may perform an action to prevent loading an unverified file and/or end the boot process. For example, where loader 222 determines that the fingerprint does not match the hash, and/or where loader 222 determines that a fingerprint is not included in the fingerprint library but is needed to verify the file, loader 222 may perform an action to prevent loading of the file, may perform an action that does not include verifying the file, may perform an action to indicate a boot failure (e.g., via sending or presenting a notification), and/or may perform an action to terminate the boot process. In some implementations, when a file is not verified or a file cannot be loaded (e.g., because the file cannot be verified), loader 222 may perform an action to send a notification that the file was not verified, that there was a boot failure, that the boot process ended, and/or the like.

In some implementations, in the event that fingerprint verification fails, loader 222 may perform an action depending on one or more reasons for the failure. For example, if loader 222 determines that the fingerprint for the file is included in the fingerprint library, but the fingerprint does not match the hash of the file, then loader 222 may determine a verification failure (e.g., regardless of other factors). However, if loader 222 determines that the fingerprint for the file is not included in the fingerprint library, then loader 222 may or may not determine a verification failure. For example, depending on a security factor representative of a level of security that is to be implemented for the boot process, loader 222 may determine that a manifest of a file that does not have a corresponding fingerprint in the fingerprint library can or cannot be verified.

In some implementations, the security factor may be a number representative of a level of security. The security factor may be adjusted (e.g., based on user input). For example, for a security level range of 1 to 5, 5 may be highest security level (all files must be verified during boot process to load the files) and 1 may be lowest (designated files may be verified during boot process to load the files). For example, for a high security level (e.g., using the range of 1 to 5 above, a 4 or 5), loader 222 may require a relatively high percentage (e.g., 90% or more) or all of the files to be verified to continue a boot process, though this may result in a slow boot process. On the other hand, for a low security level (e.g., using the range of 1 to 5 above, a 2 or 1), loader 222 may require a portion of the files to be verified (e.g., to increase speed of the boot process). As such, loader 222 may verify a file where a file does not have a corresponding fingerprint if a security factor of loader 222 satisfies a threshold security level, and may determine a verification failure of the file if the security factor does not satisfy the threshold security level.

In this way, loader 222 may perform an action associated with the operating system based on the hash and whether the fingerprint is in the fingerprint library.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow diagram of an example process 500 relating to example process 400 shown in FIG. 4. FIG. 5 shows an example of verifying an operating system during a boot process using a loader. According to some implementations, example process 500 may be performed to implement block 460 of process 400 of FIG. 4. In some implementations, one or more process blocks of FIG. 4 may be performed by one or more elements of system device 210, such as loader 222. In some implementations, one or more process blocks of FIG. 4 may be performed by another element or group of elements of system device 210, such as initialization firmware 212, kernel 224, and/or modules 226.

As shown in FIG. 5, loader 222 may determine whether a fingerprint for the file is in the fingerprint library (block 510). If, at block 510, the fingerprint for the file is in the library, loader 222 may compare the fingerprint with a hash of the file (block 520). Loader 222 may then determine whether the hash matches the fingerprint (block 530). If, at block 530, loader determines that the hash matches the fingerprint, loader 222 may verify the file (block 540). Loader 222 may then indicate that the file is verified (block 550). Loader 222 may then load the file and continue the boot process (e.g., by obtaining a next file of the boot process (e.g., another file of kernel 224 or a module 226)) (block 560). In some implementations, if all files of kernel 224 and/or modules 226 have been verified and/or loaded, after block 560, process 500 (and/or process 400) ends and loader 222 may handover the boot process to kernel 224 to permit kernel 224 to continue the boot process of operating system 220.

If, at block 530, loader 222 determines that the fingerprint does not match the hash of the file, loader 222 may not verify the file (block 570). Loader 222 may then not load file (block 580). In some implementations, after block 580, loader 222 may end the boot process, may cause the boot process to end (e.g., based on not loading the file), and/or may send a notification that the file was not verified. Furthermore, after block 580, process 500 (and/or process 400) ends.

If, at block 510, loader 222 determines that the fingerprint for the file is not in the fingerprint library, loader 222 determines whether a fingerprint is needed to verify the file. If, at block 590, a fingerprint is needed to verify the file, loader 222 does not verify the file (block 570). If, at block 590, a fingerprint is not needed to verify the file, loader 222 may indicate the file is verified and/or load the file and continue the boot process (block 550 and block 560).

As indicated above, FIG. 5 is provided merely as an example. Other examples are possible and may differ from what was described with regard to FIG. 5.

According to some implementations described herein, loader 222 may perform a verification process to verify files and/or modules (e.g., files or modules associated with kernel 224) of operating system 220 during the boot process, such as to ensure that the files of kernel 224 have not been corrupted prior to or during the boot process. Accordingly, loader 222 may prevent malware from harming targeted systems, and thus prevent system failures, shutdowns, inoperability, security breaches, loss of files or information (e.g., personal or financial information), theft, or the like. Therefore, loader 222 may ensure the health of system device 210 by preventing a malware attack, thus, conserving resources, time, and costs of handling an attacked system and/or recovering the system from the potential malware attack.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to, during a loading process of a boot process of an operating system:
 identify a file to be loaded for the operating system, where the operating system is being loaded during the boot process;
 identify a manifest of the file;
 verify the manifest of the file based on a supplied signature of the manifest and a supplied certificate chain of the supplied signature,
  the supplied certificate chain used to enable a loader, in the operating system, to flexibly adapt to verify an increasing amount of files as a parameter associated with the device evolves over time;
 identify a fingerprint, associated with the file, in a fingerprint library;
 calculate a hash of the file;
 compare the hash of the file and the fingerprint; and
 verify the file based on the hash of the file matching the fingerprint associated with the file.

2. The device of claim 1, where the one or more processors are further to:
continue the boot process by identifying a next file to be verified.

3. The device of claim 1, where the one or more processors, when determining that the file is to be verified, are to:
determine whether the manifest of the file was previously verified during the boot process; and
determine that the file is to be verified when the file has not been previously verified during the boot process.

4. The device of claim 3, where the one or more processors are further to:
maintain a collection of manifests verified during the boot process; and
where the one or more processors are to:
 determine that the manifest of the file is not in the collection of manifests verified during the boot process; and
 determine that the file is to be verified.

5. The device of claim 1, where the one or more processors, when calculating the hash of the file, are to:
determine a hash algorithm used to generate the fingerprint; and
calculate the hash of the file using the hash algorithm.

6. The device of claim 1, where the one or more processors, when identifying the manifest, are to:
identify the manifest based on a prefix of the file,
 where the manifest includes a same prefix as the prefix of the file.

7. The device of claim 1, where the file is a first file, and where the one or more processors are further to:
determine that a fingerprint associated with a second file is not in the fingerprint library; and
verify, based on determining that the fingerprint is not in the fingerprint library, the second file based on a security factor of the device.

8. A non-transitory computer-readable medium storing instructions, the instructions comprising:
one or more instructions that, when executed by one or more processors of a device during a loading process of a boot process, cause the one or more processors to:
 identify a file to be loaded for an operating system, where the operating system is being loaded during the boot process;

identify a manifest of the file based on a prefix of the file;

verify the manifest of the file based on a signature of the manifest and a certificate chain of the signature, the certificate chain used to enable a loader, in the operating system, to flexibly adapt to verify an increasing amount of files as a parameter associated with the device evolves over time;

identify a fingerprint associated with the file in a fingerprint library;

calculate a hash of the file based on the fingerprint;

compare the hash of the file and the fingerprint; and perform an action associated with the boot process of the operating system based on comparing the hash of the file and the fingerprint.

9. The non-transitory computer-readable medium of claim 8, where the one or more instructions, when executed by the one or more processors, further cause the one or more processors to:

update a collection to indicate that the manifest of the file has been verified, where the collection is associated with the boot process of the operating system.

10. The non-transitory computer-readable medium of claim 9, where the one or more instructions, that cause the one or more processors to update the collection, cause the one or more processors to:

add a prefix of the manifest and a size of the manifest to the collection.

11. The non-transitory computer-readable medium of claim 8, where the one or more instructions, when executed by the one or more processors, further cause the one or more processors to:

determine whether the manifest of the file was previously verified during the boot process; and determine that the file is to be verified when the file has not been previously verified during the boot process.

12. The non-transitory computer-readable medium of claim 8, where the one or more instructions, that cause the one or more processors to calculate the hash based on the fingerprint, cause the one or more processors to:

determine a hash algorithm used to generate the fingerprint; and calculate the hash of the file using the hash algorithm.

13. The non-transitory computer-readable medium of claim 8, where the one or more instructions, that cause the one or more processors to perform the action, cause the one or more processors to:

when the hash of the file matches the fingerprint associated with the file, verify the file to permit the file to be loaded during the boot process.

14. The non-transitory computer-readable medium of claim 8, where the one or more instructions, that cause the one or more processors to perform the action, cause the one or more processors to:

when the hash of the file does not match the fingerprint associated with the file, prevent loading of the file during the boot process.

15. A method for verifying a file during a loading process of a boot process of an operating system, the method comprising:

identifying, by a device, the file to be loaded for the operating system during the boot process of the operating system;

determining, by the device, whether a manifest of the file has been verified during the boot process;

verifying, by the device, the manifest of the file, when the manifest has not been verified during the boot process, based on a signature of the manifest and a supplied certificate chain associated with the signature;

a digital signature of the manifest is to be verified using the supplied certificate chain, and the supplied certificate chain used to enable a loader, in the operating system, to flexibly adapt to verify an increasing amount of files as a parameter associated with the device evolves over time;

determining, by the device, whether a fingerprint associated with the file is in a fingerprint library associated with the operating system;

calculating, by the device, a hash of the file based on the fingerprint associated with the file being in the fingerprint library;

comparing the hash of the file and the fingerprint associated with the file to verify the file; and performing, by the device and based on comparing the hash of the file and the fingerprint associated with the file, an action associated with verifying the file.

16. The method of claim 15, where performing the action comprises:

determining that the hash of the file matches the fingerprint associated with the file;

verifying the file when the hash of the file matches the fingerprint associated with the file; and loading the file into a memory of the device to continue the boot process.

17. The method of claim 15, where performing the action comprises:

determining that the hash of the file does not match the fingerprint associated with the file; and preventing the file from being loaded into a memory of the device.

18. The method of claim 17, where performing the action further comprises:

sending a notification that the file was not verified, or ending the boot process.

19. The method of claim 15, where the file is a first file, the method further comprising:

identifying a second file to be loaded for the operating system during the boot process of the operating system; and determining that a manifest of the second file has been previously verified during the boot process based on the manifest of the second file being indicated in a collection.

20. The method of claim 15, where the file is a first file, the method further comprising:

determining that a fingerprint associated with a second file is not in the fingerprint library; and verifying the second file based on a security factor of the device.

* * * * *